(12) United States Patent  
Gautron et al.

(10) Patent No.: US 9,082,230 B2  
(45) Date of Patent: Jul. 14, 2015

(54) METHOD FOR ESTIMATION OF THE QUANTITY OF LIGHT RECEIVED AT A POINT OF A VIRTUAL ENVIRONMENT

(75) Inventors: Pascal Gautron, Cesson Sevigne Cedex (FR); Jean-Eudes Marvie, Cesson Sevigne Cedex (FR)

(73) Assignee: Thomson Licensing, Boulogne, Billancourt (FR)

( * ) Notice: Subject to any disclaimer, the term of this patent is extended or adjusted under 35 U.S.C. 154(b) by 0 days.

(21) Appl. No.: 13/200,626

(22) Filed: Sep. 27, 2011

(65) Prior Publication Data

US 2013/0176313 A1 Jul. 11, 2013

(30) Foreign Application Priority Data

Sep. 30, 2010 (FR) ...................................... 10 57903

(51) Int. Cl.  
*G06T 15/50* (2011.01)
(52) U.S. Cl.  
CPC ...................................... *G06T 15/50* (2013.01)
(58) Field of Classification Search  
USPC ....................... 345/419, 426; 382/154; 348/36  
See application file for complete search history.

(56) References Cited

U.S. PATENT DOCUMENTS

| 5,742,749 | A | | 4/1998 | Foran et al. |
| 6,031,542 | A | * | 2/2000 | Wittig ............................ 345/426 |
| 6,476,805 | B1 | * | 11/2002 | Shum et al. ................... 345/420 |
| 7,609,265 | B2 | * | 10/2009 | Sloan et al. ................... 345/426 |
| 8,436,855 | B1 | * | 5/2013 | Morgan et al. ................ 345/426 |
| 8,542,231 | B2 | * | 9/2013 | Kaplanyan .................... 345/426 |
| 2009/0102843 | A1 | * | 4/2009 | Sloan et al. ................... 345/426 |
| 2010/0315422 | A1 | * | 12/2010 | Andre et al. .................. 345/426 |
| 2011/0012901 | A1 | * | 1/2011 | Kaplanyan .................... 345/426 |

FOREIGN PATENT DOCUMENTS

WO    WO2006049870    5/2006

OTHER PUBLICATIONS

Corsini et al. "Stereo Light Probe", Eurographics 2008.*  
Bunnell, "Dynamic Ambient Occlusion and Indirect Lighting", NVIDIA Corporation, Excerpted from GPU Gems 2, 2005.  
Garland et al., "Hierarchical Face Clustering on Polygonal Surfaces", Proceedings of the 2001 Symposium on Interactive 3D Graphics, Research Triangle Park, NC, Mar. 19-21, 2001, pp. 49-58.

(Continued)

*Primary Examiner* — Kimbinh T Nguyen  
(74) *Attorney, Agent, or Firm* — Jeffrey D. Carter

(57) ABSTRACT

A method for estimation of the quantity of light received at a point P of a virtual environment that comprises several first points lit by a light source, these first points forming a plurality of groups each comprising at least one first point is disclosed. In order to improve the display while minimizing the required calculation time, the method estimates the quantity of incident light received at point P by estimating a surface including point P grouping at least some of the points of the virtual environment, estimating a first group of points contributing to the lighting of point P by reflection of the incident light received from the light source based on occlusion information associated with the surface including point P and estimating the quantity of incident light received by the first group of point based on reflectance information associated with such group.

10 Claims, 7 Drawing Sheets

(56) References Cited

OTHER PUBLICATIONS

Figure 1A:
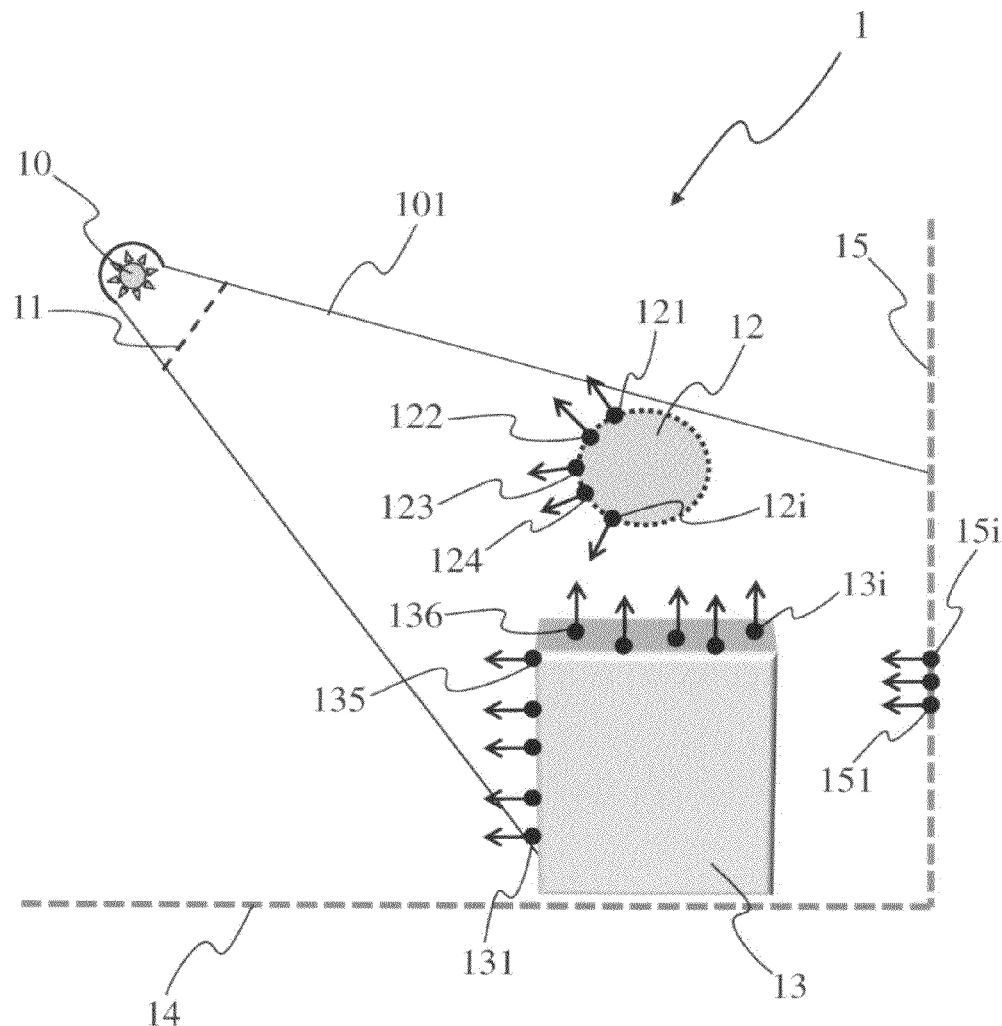

Meneveaux et al., "Efficient Clustering and Visibility Calculation for Global Illumination", Proceedings of AFRIGRAPH 2003, Feb. 2002.
Dong et al., "Interactive Global Illumination using Implicit Visibility", 15th Pacific Conference on Computer Graphics and Applications, Oct. 29, 2007, pp. 77-86.
French Search Report dated Jun. 30, 2011.
Williams, L., "Casting curved shadows on curved surfaces". 1978, Proc. Of the 5th annual conference on Computer Graphics and Interactive Techniques (SIGGRAPH '78), 1978, vol. 12, No. 3, pp. 270-274.
Goral, C. et al., "Modelling the Interaction of Light Between Diffuse Surfaces". Computer Graphics, vol. 18, No. 3, Jul. 1984, pp. 213-222.
Ward, G. et al., "A ray tracing solution for diffuse interreflection". 1988, Proc. Of the 15th annual conference on Computer Graphics and Interactive Techniques (SIGGRAPH '88), 1988, ACM, New York, USA, pp. 85-92.
Ward, G. et al., "Irradiance Gradients". 1992, Proc of 3rd Eurographics on Rendering Workshop, Bristol, England, Apr. 1992, pp. 1-11.
Veach, E. et al., "Bidirectional Estimators for Light Transport". Eurographics Rendering Workshop 1994 Proceedings, Darmstadt, Germany, Jun. 1994, pp. 147-162.
Jensen, H. W. et al., "Photon maps in bidirectional Monte Carlo ray tracing of complex objects". Computer & Graphics, vol. 19, No. 2, Mar. 1995, pp. 215-224.
Mittring, M., "Finding next gen: Cryengine 2". Advanced Real-Time Rendering in 3D Graphics and Games Course, SIGGRAPH 2007 Courses, Chapter 8, Aug. 8, 2007, pp. 97-121.
Ritschel, T. et al., "Approximating Dynamic Global Illumination in Image Space", Proc. ACM SIGGRAPH Symposium on Interactive 3D Graphics and Games, Boston, MA, Feb. 27, 2009, pp. 1-8.
Loos, B. et al., "Volumetric Obscurance". 2010, Proc. ACM SIGGRAPH Symposium on Interactive 3D Graphics and Games (I3D), ACM, New York, NY, USA, Feb. 19, 2010, pp. 151-156.
Benthin et al—A Scalable Approaccomputer Graphics Forum | 22 (3): 621-630 Sp. Iss. SI 2003-H to Interactive Global Illumination-Univ Saarland-Blackwell Publ Ltd.
Lv et al _A Fast Method for Real-Time Computation of Approximated Global Illumination—Chinese Acad Sci | Inst Software | State Key Lab Comp Sci-Proceedings of the 2009 Sixth International Conference on Computer Graphics, Imaging and Visualization | : 62-68 2009-IEEE Computer Soc.

\* cited by examiner

METHOD FOR ESTIMATION OF THE QUANTITY OF LIGHT RECEIVED AT A POINT OF A VIRTUAL ENVIRONMENT

This application claims the benefit, under 35 U.S.C. §119 of FR Patent Application 1057903, filed 30 Sep. 2010.

1. DOMAIN OF THE INVENTION

The invention relates to the domain of synthesis image composition and more specifically to the domain of the estimation and the simulation of the global illumination of a virtual environment taking into account the reflection of the light within the virtual environment. The invention is also understood in the context of special effects for a live composition.

2. PRIOR ART

According to the prior art, different methods exist to simulate the global illumination of a virtual environment, these methods can be divided into three main groups. The first group of methods is based on the decomposition of the virtual environment (also called the scene) into very small elements and on the estimation of the energy transfer between two elements of element pairs. Known as radiosity methods, these methods generally need significant memory requirements and must carry out numerous visibility tests across elements, which are very costly in terms of require calculating power. The second group of methods is based on ray tracing to follow the current path followed by the light rays, using photon mapping techniques or ray tracing or both. The third group of methods is based on approximations in the screen space considering only information on the distances of visible objects from the scene according to the viewpoint of a spectator viewing the scene. These latter methods use filtering techniques to approach the transfer of energy between the neighbouring visible points. These latter methods have the advantage of being relatively rapid but provide a coarse result With the emergence of interactive simulation games and applications, notably in 3D, the need is being felt for live simulation methods offering a high quality and realistic, rapid global illumination estimation.

3. SUMMARY OF THE INVENTION

The purpose of the invention is to overcome at least one of these disadvantages of the prior art.

More specifically, the purpose of the invention is notably to optimise the calculation time and/or calculation power necessary to compose a live realistic display of the diffusion of light in a virtual environment taking into account the reflection of the light on the objects composing the virtual environment.

The invention relates to a method for estimation of the quantity of light received at a point P of a virtual environment, the virtual environment comprising a plurality of first points lit by a light source, the first points forming a plurality of groups each comprising at least one first point, the method comprising steps for:
- estimating, for each group, the quantity of incident light received,
- estimating a surface grouping at least a share of the points of the virtual environment visible from a viewpoint, the surface comprising the point P,
- estimating at least a first group of the of the plurality of groups contributing to the lighting of the point P by reflection of the incident light received from the light source according to at least one item of occlusion information associated with the surface, and
- estimating the quantity of light received by the point P from the quantity of incident light received by the at least one first group according to the at least one item of reflectance information associated with the at least one first group.

According to a particular characteristic, the method also comprises a step of estimation, for each first point, of a value representative of the average of distances separating each first point from a plurality of first points of its neighbouring area, the first points being grouped into said groups according to their estimated values and information representative of the location and orientation of first points, an item of orientation information representative of the orientation of the group and an item of location information representative of the location of the group being associated with each group.

Advantageously, the method also comprises the following steps for:
- estimating, for each first point, a value representative of the average of distances separating each first point from a plurality of first points of its neighbouring area,
- grouping first points into a plurality of second groups according to estimated values and information representative of the location and orientation of first points, an item of orientation information representative of the orientation of the second group and an item of location information representative of the location of the second group being associated with each second group, and
- generating of groups by grouping the second groups according to said orientation and location information of second groups.

According to a specific characteristic, the information representative of location of first points is obtained by estimation of first distances separating the light source from first points according to incidence directions, the first distance estimated being stored in a shadow map associated with the virtual environment and the light source.

Advantageously, the method comprises a step of estimation of second distances separating the viewpoint and points of the environment visible from the viewpoint, the second distances estimated being stored in a depth map associated with the virtual environment and the view point, the at least one item of occlusion information being obtained from estimated second distances.

4. LIST OF FIGURES

Figure 1B:
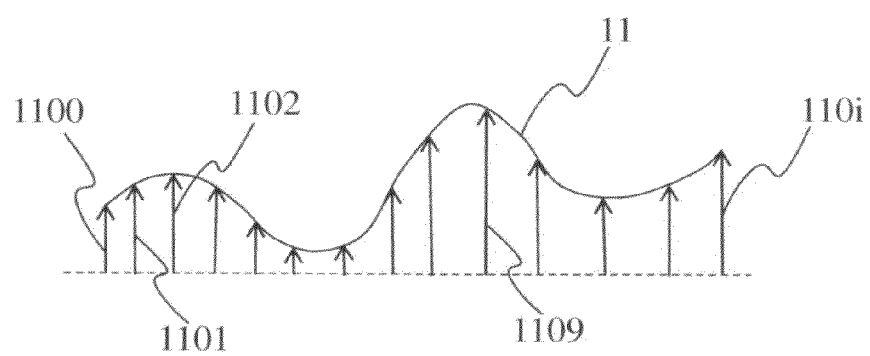
Figure 2:
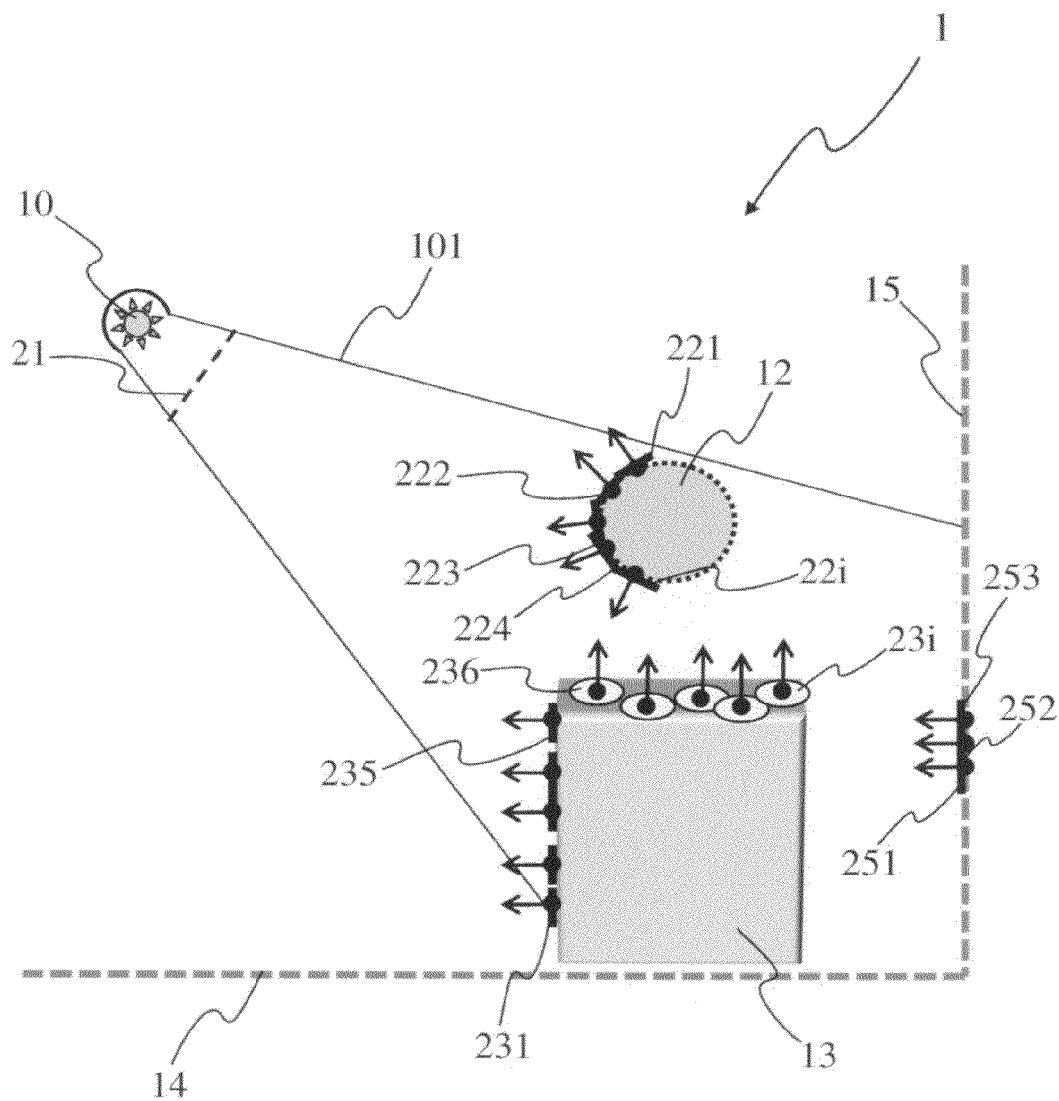
Figure 3:
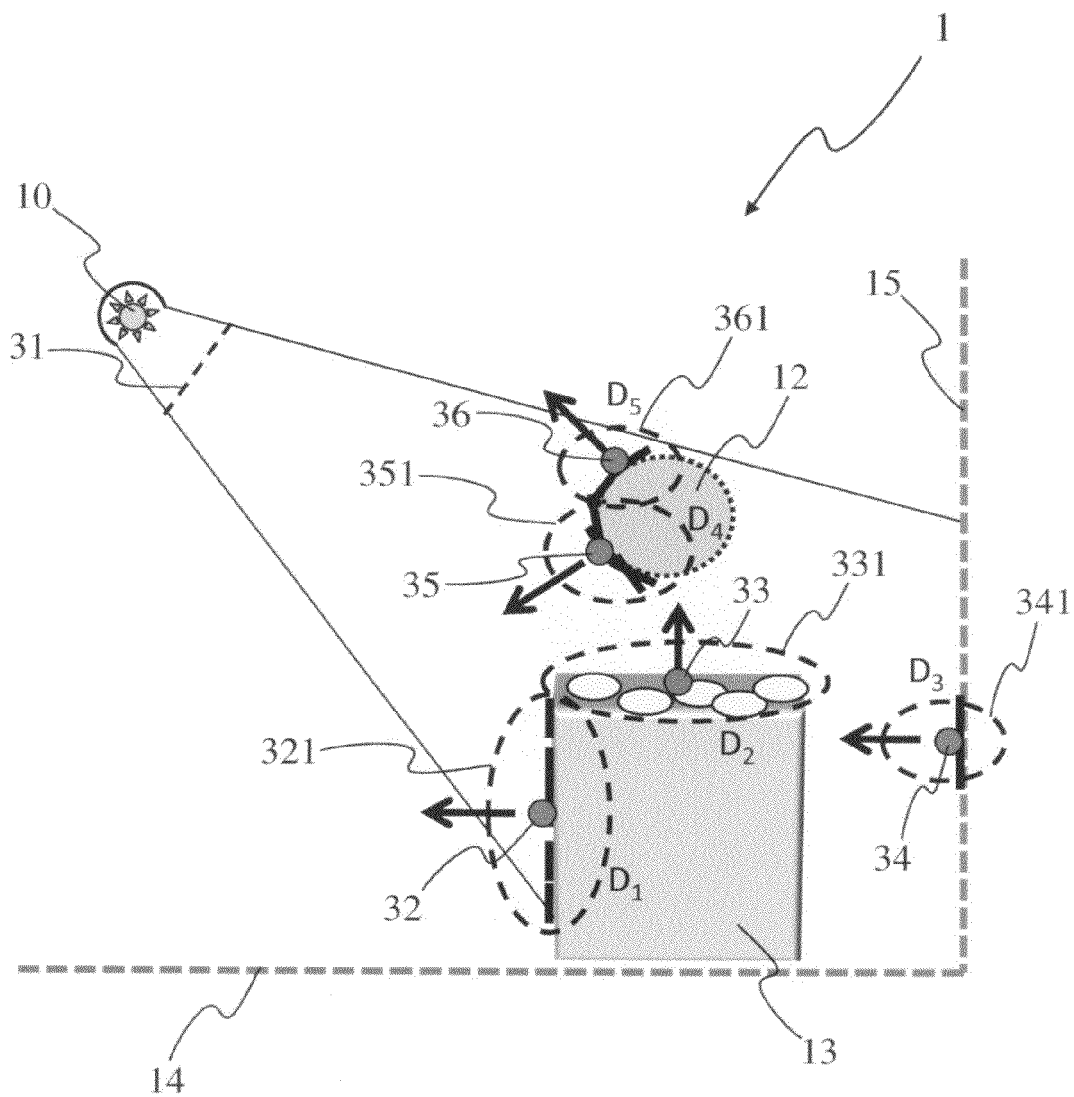
Figure 4A:
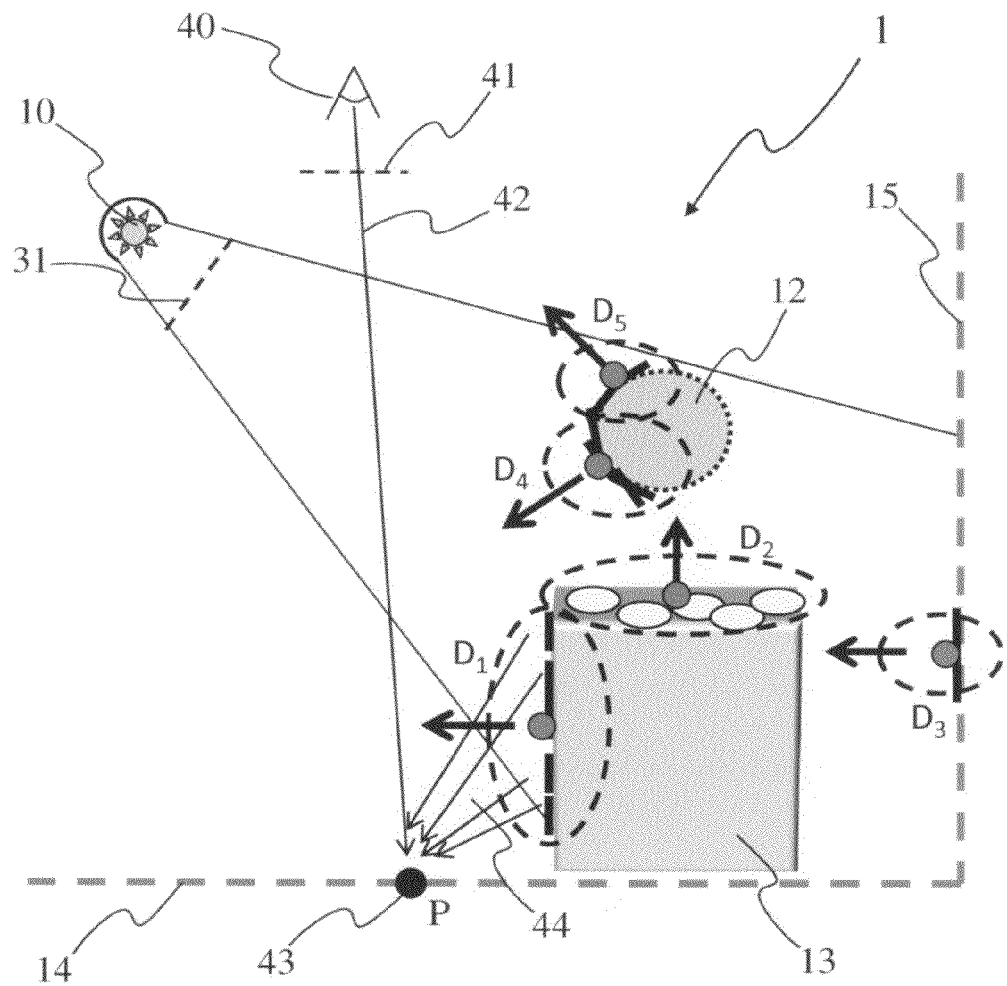
Figure 4B:
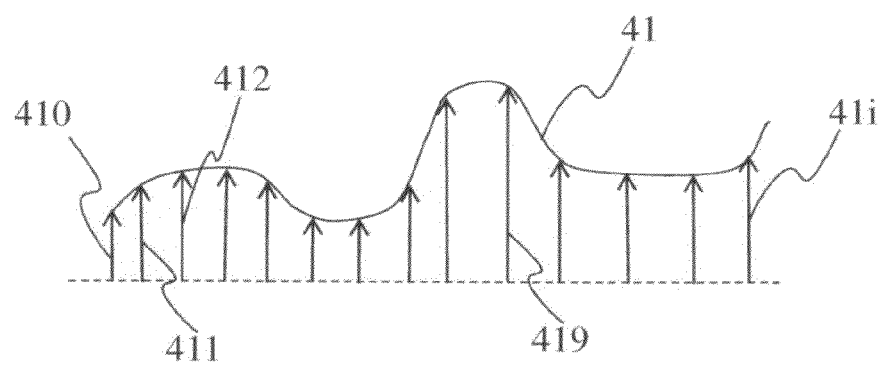
Figure 5:
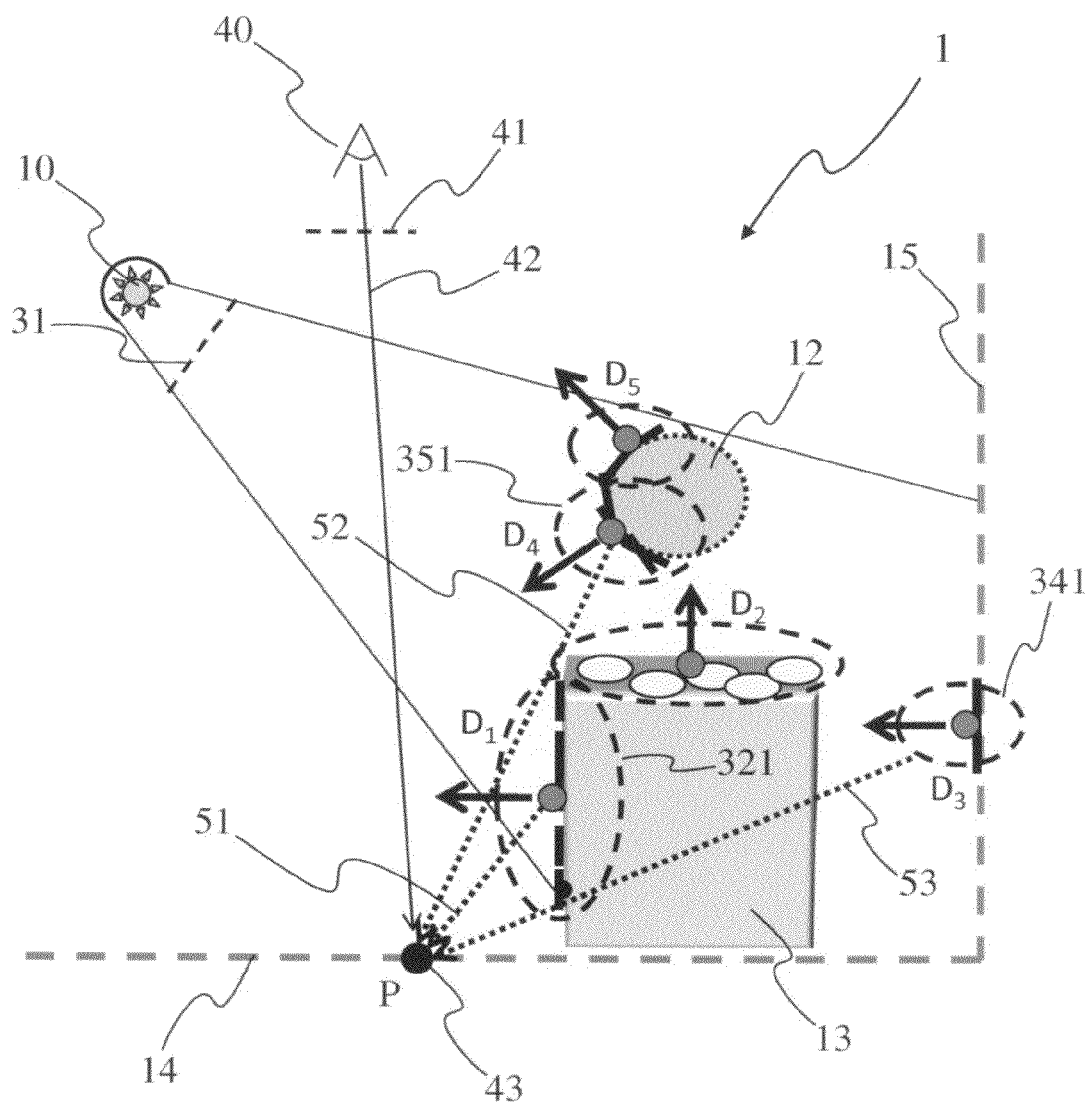
Figure 6:
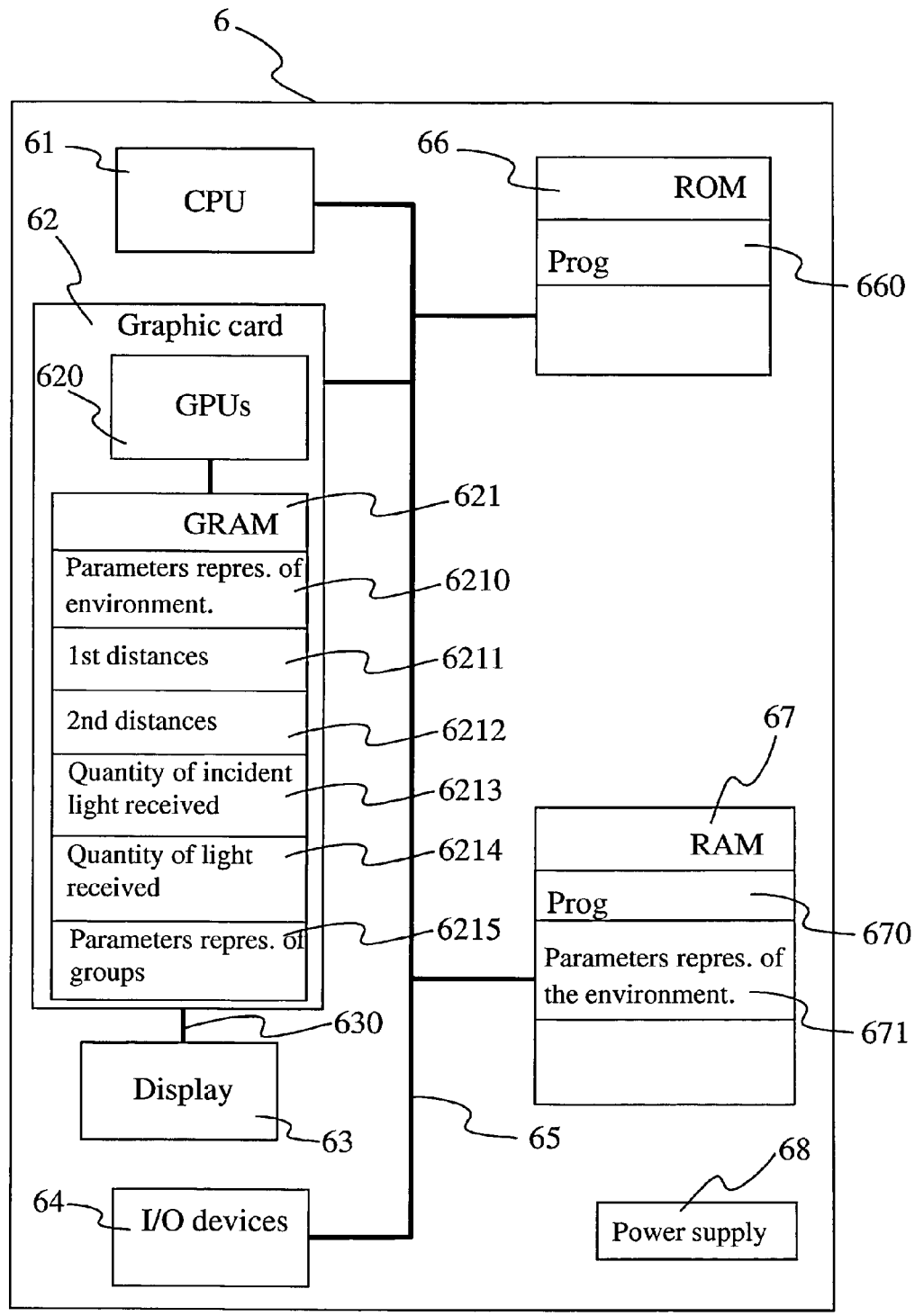
Figure 7:
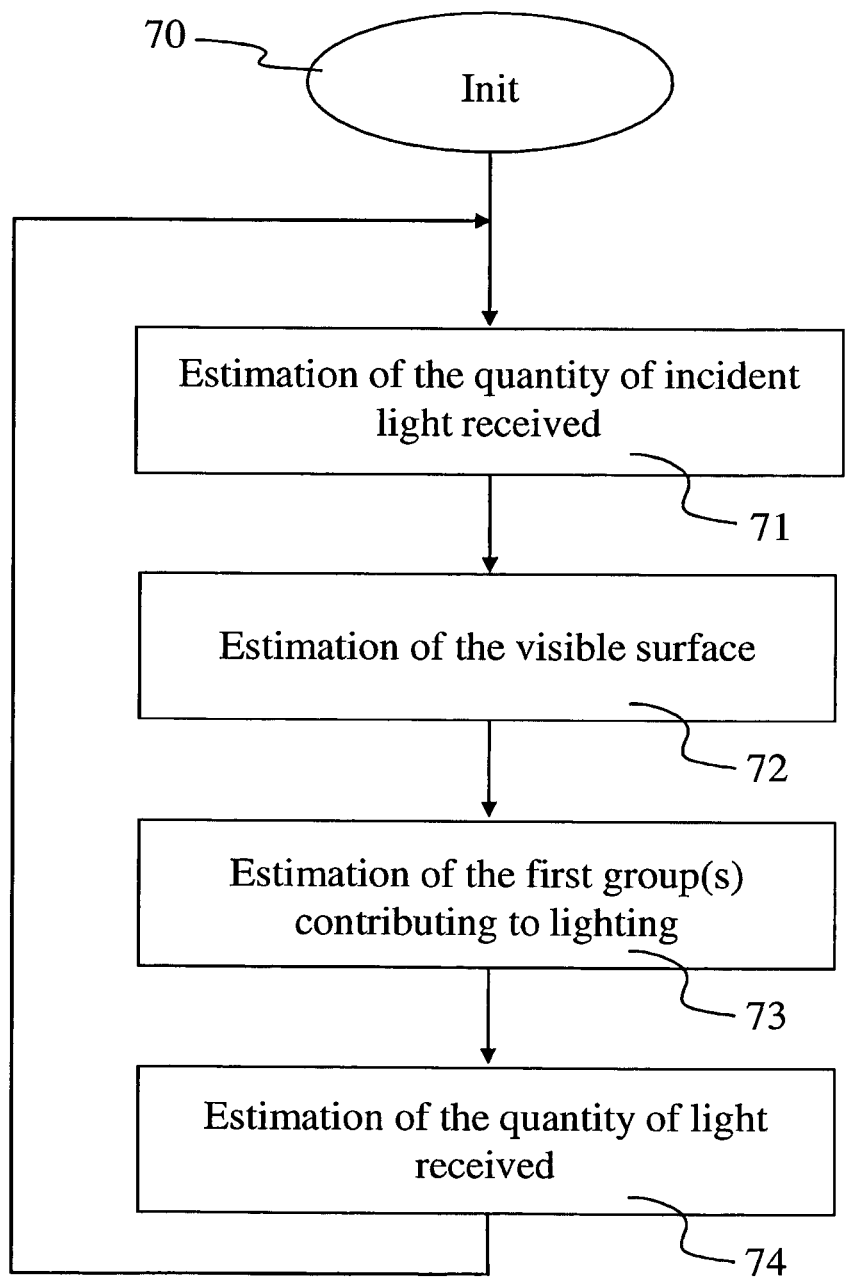

The invention will be better understood, and other specific features and advantages will emerge upon reading the following description, the description making reference to the annexed drawings wherein:

FIG. 1A diagrammatically shows a virtual environment lit by a light source, according to a particular embodiment of the invention, FIG. 1B shows a shadow map associated with the virtual environment and with the light source of FIG. 1A, according to a particular embodiment of the invention, FIGS. 2 and 3 diagrammatically show the grouping of indirect light emitter points in the virtual environment of FIG. 1, according to two particular embodiments of the invention, FIGS. 4A and 5 diagrammatically show a method for estimation of the quantity of light received at a point in the virtual environment of FIG. 1, according to a particular embodiment of the invention, FIG. 4B shows a shadow map associated with the virtual environment of FIGS. 1 and 4A and at a viewpoint of FIG. 4A, according to a particular embodiment of the invention, FIG. 6 shows a device implementing a method for estimation of the quantity of light received at a point in the virtual environment of FIG. 1, according to a particular implementation of the invention, FIG. 7 shows a method for estimation of the quantity of light received at a point in the virtual environment of FIG. 1, according to a particular implementation of the invention.

5. DETAILED DESCRIPTION OF EMBODIMENTS OF THE INVENTION

FIG. 1 shows a virtual environment or a virtual scene 1 lit by a light source 10. The light supplied by the light source 10 forms a cone of light 101. The virtual environment 1 comprises one or several virtual objects 12, 13, 14 and 15, modelled according to any method known to those skilled in the art, for example by polygonal modelling, in which the model is assimilated with a set of polygons each defined by the list of summits and edges that compose it, NURBS (Non uniform rational basic spline) type curve modelling in which the model is defined by a set of curves created via control vertices, modelling by subdivision of surfaces. By virtual object is understood any virtual representation (obtained by modelling) of an object (real or fictitious) composing a real environment (for example the ground, a house or a house front, a car, a tree, that is to say any element composing an environment such as a part of a house, a street, a town, the countryside, etc.) or imaginary. Each object 12, 13, 14 and 15 of the virtual environment is characterized by a surface covering it, the surface of each object having reflectance properties (corresponding to the proportion of incident light reflected by the surface in one or several directions) that are specific to it. Advantageously, the reflectance of the surface of an object varies according to the zone of the object reflecting the light (a zone of the surface comprising one or several points of the surface) that is to say that the reflectance of the surface of an object is not constant. According to a variant, the reflectance of the surface of an object is constant at any point of the surface of the object. Thus, the object 12 receives a quantity of incident light from the light source 10, this incident light being reflected by the points 121 to 12i lit by the light source 10. The points 121 to 12i correspond to singular points or according to a variant to surface elements, each surface element comprising several points (for example 5, 10 or 20 points). In the remainder of the description of FIG. 1, a point of a surface designates both a unitary point and a surface element. In the same way, the object 13 receives a quantity of incident light from the light source 10, this incident light being reflected by the points 131 to 13i lit by the light source 10, each point corresponding to a unitary point or to a surface element. The object 15 also receives a quantity of incident light reflected by the points 151 to 15i that each correspond to a unitary point or to a surface element. The normal at the surface element associated with each point 121 to 12i, 131 to 13i and 151 to 15i is represented by a black arrow. The information relative to the normal of each surface element reflecting the light is useful for estimating the quantity of light reflected according to a given direction.

According to a variant, the virtual environment 1 is lit by a plurality of light sources, for example 100, 1000, 100000 or 1000000 light sources.

According to a first embodiment, the location of points lit by the light source 10, called first points, is done in the space of the virtual environment, called "world space" and is represented by geometric coordinates in the world space. This information, in addition to reflectance information associated with the first points and information relative to the normal of surface elements associated with the first points are recorded in a data structure composed of tables recorded in a memory associated with the GPUs. These recording are respectively called reflectance recordings, normal recordings and location recordings. These recordings enable the set of first points of the virtual environment 1 to be referenced, said first points are able to reflect the light from the light source 10 to other points of the virtual environment, these other points being lit or not by the light source. A surface S is defined by linking the set first points together.

According to a second embodiment, the virtual environment 1 is displayed as seen from the light source 10. The information representative of the virtual environment 1 as seen from the light source 10 is stored in a shadow map 11. The shadow map advantageously comprises for each first point of the virtual environment 1 an item of information representative of the distance separating the light source 10 from the first point considered. FIG. 1B shows such a shadow map 11 according to a particular embodiment of the invention. The information representative of the distance is represented by a vector 1100 to 110i for which the norm is equal to the distance between the light source and the lit point being considered. The shadow map is thus composed of a plurality of points associated with the first points of the virtual environment 1 projected onto a surface formed by the cone of light 10 and perpendicular to the main lighting direction of the light source 10. An item of information representative of the distance light source/first point is associated with each point corresponding to the shadow map. By linking each point of the shadow map formed by the vector representative of the distance, a surface S' is obtained representative of the set of first points of the environment as seen from the light source 10. This surface S' is, like the surface S, representative of the set of first points of the environment, that is to say points of the virtual environment lit by the light source 10. This surface S', just like the surface S, also representative of the set of points of the virtual environment is able to reflect the light from the light source 10 to other points of the virtual environment, these other points being lit or not by the light source. Advantageously, in addition to information representative of the distance, information respectively representative of the reflectance of the surface element associated with each first point, of the location of the first point in the space of the shadow map and of the normal at the surface element associated with each first point, are stored in the shadow map 11. The surface S' thus corresponds to the representation of the surface S in the space of the shadow map. The use of a shadow map has the advantage of reducing the calculations required for the estimation of the quantity of light received by the virtual environment and thus of reducing the calculations required to estimate the quantity of light received by a point of the virtual environment. Due to the shadow map, in order to know if a point of the virtual environment is lit or not by the light source 10, it suffices to know the distance separating this point from the light source and the incidence direction to which it belongs. No calculation of the intersection between the line formed by the point and the light source on one hand and the objects of the virtual environment on the other hand is thus necessary, which reduces the calculations required.

FIG. 2 shows the virtual environment 1 represented in FIG. 1 for which the first points are grouped together into groups of points comprising thus several points lit by the light source 10 and able to reflect the received incident light. Such a grouping of first points has the advantage of reducing the calculations required for the estimation of the global illumination. In fact, for the estimation of the global illumination of the virtual environment 1, each first point of the virtual environment is considered as being an indirect light source able to indirectly light one or several other points of the virtual environment. The calculation of such reflections is ever more costly in terms of calculation power and/or time as the number of incident light sources increases. Considering that the indirect lighting varies slightly over a surface and that the lighting changes over a surface are directly related to the distance with respect to the neighbouring surfaces, it is possible to reduce the number of sources reflecting the incident light by grouping them coherently while preserving the quality of the lighting of the virtual environment 1. For each source of indirect light, that is to say for each source reflecting received incident light, that is to say for each first point of the surface S (or of the surface S' if in the space of the shadow map) the average distance to the first points of the surface S (respectively S') surrounding the considered light source is evaluated. To do this and to accelerate the calculations, the first points of the neighbourhood of the indirect light source belonging to the surface S (respectively S') are sampled in the world space (respectively in the space of the shadow map). Then, on the basis of their relative locations, the average distance between the indirect light source considered and the neighbouring first points is calculated. By neighbourhood of the indirect light source is understood the set of first points belonging to the surface S (respectively S') situated at a distance from the indirect light source less than a threshold value, for example at a distance less than 25 cm, 50 cm or 1 m. According to another example, the neighbourhood on an indirect light source is defined by the set of directions having as origin the indirect light source and forming a half-sphere situated above the indirect light source, that is to say above the surface element associated with the indirect light source. Thus, when a first point of the surface S (respectively S') is encountered by one of the directions forming the half-sphere, the distance between the indirect light source and this first point is calculated. Advantageously, the distances thus calculated and greater than a threshold value (for example 25 cm, 50 cm or 1 m) are not taken into account for the estimation of the average distance between the indirect light source considered and the neighbouring first points. Once the average distance considered, the first points surrounding the source point of indirect light belonging to the surface S (or S') are grouped together, the first points grouped with the indirect light source point considered being those situated at a distance from the indirect light source point less than a given threshold value (for example less than any distance comprised between 0 and 1 times the average distance, 0 being excluded). The group of points grouping the first points of the virtual environment 1 is advantageously represented by a disc 221 to 22i 231 to 23i or 251 to 253 having as centre the source point of indirect light and as a radius a radius of a value proportional to the average distance of first points of the neighbourhood of the source from the indirect light considered. These operations are advantageously reiterated for each first point, that is to say each source point of indirect light of the virtual environment 1 until a set of groups of points forming source discs of indirect light is formed, the number of discs being then equal to the number of first points. According to a variant, these operations are reiterated for a number of the first points, that is to say source points of indirect light of the virtual environment. According to this variant, the number of discs is less than the number of first points. According to this variant, one first point in 10 is taken for example, the first points selected for this variant being for example uniformly spread over the surface S (or S'). By projecting these source discs of indirect light over a surface formed by the cone of light 10 and perpendicular to the main direction of lighting of the light source 10, a map of discs emitting indirect light 21 is obtained. The reflectance properties associated with each disc advantageously correspond to the reflectance average of first points belonging to the disc.

According to a variant, the form of groups of points is different to the disc and is for example a square surface, a rectangular surface, an oval surface or any other surface of any geometric form.

FIG. 3 shows the virtual environment 1 shown in FIG. 2 for which the groups of points (or discs) are grouped into second groups of points thus comprising several groups of first points. Such a grouping of points has the advantage of reducing the even more the calculations required for the estimation of the global illumination.

According to a first embodiment, the formation of second groups of points is carried out as follows. A first disc of the map of emitter discs is selected. The discs surrounding the selected disc are tested one by one to define if they must be grouped with the first disc. A disc (or group of points) is added to the first disc (or group of points) if it verifies the following conditions:
  the location of the disc to be added is at a distance from the centre of the first disc less than a threshold value, for example twice or three times the radius of the first, and
  the orientation of the disc to be added is not too different from the orientation of the first disc.

If the disc to be added does not verify these conditions, then the disc is not added to the first disc. If the disc to be added verifies these conditions, the nit is added to the first disc and the two discs grouped together form a second group for which the centre corresponds to the barycentre of the two discs that compose it. Then another disc is tested to know if it should be added to the second group thus formed. Once all the discs close to the first disc and verifying the conditions stipulated above are added to the second group, another disc from the cap of emitters not belonging to the second group is selected and the surrounding discs are tested in turn to be added with a view to forming another second group. Thus, step by step, all the discs of the map of emitter discs are tested and grouped into a second group. A second group new formed is then defined by:
  the centre and orientation of a second group correspond to the average of the centre and orientation of groups of points (or discs) 231 to 235 forming the second group of points 321,
  the radius of the second group of points is selected in a way to encompass all the discs (or groups of points) added to the second group, and
  the reflectance of the second group of points corresponds advantageously to the weighted average of reflectance of each of the discs (or groups of points) composing it, the weighting being for example linked to the size of groups of points (for example according to the radius in the case where the group of points is a disc).

Thus, the second group of points D1 321 groups the discs 231 to 235, the barycentre of this second group of points 321 being represented by the point 32. the second group of points D2 331 groups the discs 236 to 23i, the barycentre of this second group of points 331 being represented by the point 33. The second group of points D3 341 groups the discs 251 to 253, the barycentre of this second group of points 341 being represented by the point 34. The second group of points D4 351 groups the discs 223 to 22i, the barycentre of this second group of points 351 being represented by the point 35. The second group of points D5 361 groups the discs 221 and 222, the barycentre of this second group of points 361 being represented by the point 36.

According to a second embodiment, in order to produce such a grouping, the map of indirect light emitter discs is subdivided into a plurality of zones, each zone comprising several discs of first points. The objective is to obtain for each zone a unique second group of points 321, 331, 341, 351, 361 grouping the one or several discs of first points of the zone considered. In each zone, a first disc (for example the disc 231) of the map of emitter discs belonging to this zone is selected. Then to determine if the discs (232 to 235) of the zone must be added or not to this first disc (231), a grouping rule is defined, the rule stipulating that a group of first points (or a disc) can be added to the first disc to form the second group of points of the zones considered if:

- the location of the group of points (or disc) to be added is at a distance from the centre of the second group less than a threshold value, for example twice or three times the radius of the first disc, and
- the orientation of the group of points to be added is not too different from the orientation of the first disc.

If the disc (or group of first points) to be added does not satisfy this rule, the group of first points is deleted from the zone being considered.

If the group of points to be added (for example 232) satisfies this rule, the second group of points (for example 321) is modified to include the contribution of the disc (or group of points) to be added 232 in addition to that of the first disc 231 of the zone. At the end of the test of the rule stipulated above for the set of discs 231 to 235 of the zone being considered, the following is obtained for the second group of points thus formed:

- the centre and orientation of the second group correspond to the average of the centre and orientation of groups of points 231 to 235 forming the second group of points 321,
- the radius of the second group of points is extended to encompass all the groups of points added to the second group of points, and
- the reflectance of the group of points to be added 231 is taken into account for the estimation of the reflectance of the second group. At the end of the grouping of groups of first points in order to form a second group of points, the reflectance of the second group of points corresponds advantageously with the weighted average of reflectance of each of the groups of points composing it, the weighting being for example linked to the size of groups (for example a function of the radius in the case where the group of points is a disc).

The subdivision of the map of emitter discs into several zones has the advantage of defining from the start the number of second groups of points and of defining which discs (or groups of points) are likely to form a given second group of points. This enables notably the calculations required for the grouping of discs into second groups of points to be simplified while limiting the grouping possibilities. The number of subdivision zones of the map of emitter discs is a parameter that can be adjusted and predetermined by a user for example.

Thus, the second group of points D1 321 groups the discs 231 to 235, the barycentre of this second group of points 321 being represented by the point 32. the second group of points D2 331 groups the discs 236 to 23i, the barycentre of this second group of points 331 being represented by the point 33. The second group of points D3 341 groups the discs 251 to 253, the barycentre of this second group of points 341 being represented by the point 34. The second group of points D4 351 groups the discs 223 to 22i, the barycentre of this second group of points 351 being represented by the point 35. The second group of points D5 361 groups the discs 221 and 222, the barycentre of this second group of points 361 being represented by the point 36.

FIGS. 4A and 5 show a method for estimation of the quantity of light received by a point 43 of the virtual environment 1 taking into account the reflection of the incident light received by the objects 12, 13, and 15 of the virtual environment 1 lit by a light source 10, according to a particular embodiment of the invention.

FIG. 4A shows the virtual environment 1 of FIG. 1 as seen from a viewpoint 40, for example a spectator of the virtual environment 1. According to the example of FIG. 4A, the spectator 40 looks at the point P 43 of the virtual environment 1 according to an observation direction 42, the point P 43 corresponding to the intersection between the observation direction 42 and the first object of the virtual environment 1 encountered by this observation direction having as an origin the viewpoint 40, namely the object 14. In order to display the virtual environment 1 from the viewpoint 40, the quantity of light received by the point P 43, encompassing the quantity of light received from the light source 10 and the quantity of light reflected by the first points of the virtual environment 1 participating in the indirect lighting of the point P by reflection of the light received from the light source 10. To do this, a surface S1 grouping all the points of the virtual environment 1 visible from the viewpoint 40 are defined. Then the first points of the virtual environment 1 participating in the indirect lighting of the point P 43 by reflection of the incident light received by these first points are defined from an item of occlusion information associated with the surface S1. To do this, for each first point of the virtual environment, it is estimated if the direction defined by the line linking the first point considered to the point P 43 having as origin the first point considered has an intersection with the surface S1. If the direction previously defined has an intersection with the surface S1, then there is occlusion and the first point considered is not part of the first points contributing to the indirect lighting of the point P 43. In the contrary case, that is to say if the direction previously defined does not have an intersection with the surface S1, then there is no occlusion and the first point considered is part of the first points contributing to the indirect lighting of the point P 43. This is shown in FIG. 5.

FIG. 5 shows the direction between on one hand the first points (that is to say able to reflect the incident light received from the light source 10 to other points of the virtual environment) and the point P 43 on the other hand having as origin the first points. Thus, the direction 51 represents the main direction of reflection of the second group of points D1 321 to the point P 43. The direction 52 represents the main direction of reflection of the second group of points D4 351 to the point P 43. The direction 53 represents the main direction of reflection of the second group of points D3 341 to the point P 43. As appears clearly in FIG. 5, the directions 51 and 52 do not have an intersection with the surface S1 (defined by the set of points visible from the view point 40) though the direction 53 has an intersection with S2. This signifies that the second group of points D1 321 and D4 351 contribute to the indirect lighting of the point P 43 by reflection of the incident light received from the light source 10 while the second group of points D3 341 does not contribute to the indirect lighting of the point P 43. FIG. 5 shows the first points of the virtual environment 1 grouped into groups then into second groups. The determination of first points (as shown in FIG. 1) or of groups of points (as shown in FIG. 2) contributing to the indirect lighting is carried out in the same way.

According to a first embodiment, the determination of first points (or groups of points or second groups of points) contributing to the indirect lighting of the point P 43 is carried out in the world space, that is to say in the space of the virtual environment from geometric coordinates of points (and/or points representative of groups of points, for example the barycentre or the centre of point groups) considered. The arrows 44 represent the reflection of the incident light received by the discs (or groups of points) 231 to 235 to the point P 43.

According to a second embodiment, the determination of first points (or groups of points or second groups of points) contributing to the indirect lighting of the point P 43 is carried out in the space of a depth map 41. According to this second embodiment, the virtual environment 1 is displayed as seen from the viewpoint 40. The information representative of the virtual environment 1 as seen from the viewpoint 40 is stored in a depth map 41. The depth map advantageously comprises for each visible point of the virtual environment 1 from the viewpoint an item of information representative of the distance separating the viewpoint 40 of the visible point considered. FIG. 4B shows such a depth map 41 according to a particular embodiment of the invention. The information representative of the distance is represented by a vector 410 to 41*i* of which the norm is equal to the distance between the view point 40 and the visible point considered. The depth map is thus composed of a plurality of points associated with the visible points of the virtual environment 1 projected onto a surface formed for example by a cone representative of the field of vision of the viewpoint 40 and perpendicular to the direction of observation of the viewpoint 40. An item of information representative of the depth, that is to say of the distance viewpoint/visible point, is associated with each corresponding point of the depth map. By linking each point of the depth map formed by the end of the vectors representative of depth, a surface S1' is obtained representative of the set of visible points of the environment as seen from the view point 40. This surface S1' is, like the surface S1, representative of the set of visible points of the environment from the viewpoint, comprising the point P 43. In order to determine which are the first points that contribute to the indirect lighting of the point P, the method is the same as that described with regard to the first embodiment of FIG. 4A. An item of occlusion information is associated with the surface S1' and to determine if a first point contributes to the indirect lighting of the point P 43, it suffices to determine if the direction corresponding to the line having as first extremity the first point (or group of points or second group of points) and as second extremity the point P 43 has an intersection with the surface S1'. In the case of an intersection, the first point (or group of points or second group of points) considered does not contribute to the indirect lighting of the point P and in the contrary case, it contributes to the indirect lighting of the point P.

To obtain the quantity of light received by the point P, it remains to add the quantities of light reflected by each of the first points (or group of points or second group of points) contributing to the indirect lighting of the point P, the quantity of light reflected by a first point (or group of points or second group of points) being obtained according to any method known to those skilled in the art from the quantity of incident light received by the first points and reflectance information associated with the first points considered. To obtain the total quantity of light received by the point P, the quantity of incident light received from the light source must also be added if the point P is also a first point of the light environment, that is to say a point lit directly by the light source.

To obtain the quantity of light received by a spectator looking at the virtual environment 1 according to the observation direction 42, it suffices to multiply the reflectance function associated with the point P 43 by the global quantity of light received by the point P. Finally, to determine the total quantity of light received by a spectator 40, the quantity of light received according to each of the observation direction must be estimated and added up.

FIG. 6 diagrammatically shows a hardware embodiment of a device 6 adapted for the estimation of the quantity of light received at a point of a virtual environment 1 and of the creation of display signals of one or several images. The device 6 corresponding for example to a personal computer PC, a laptop or a games console.

The device 6 comprises the following elements, connected to each other by a bus 65 of addresses and data that also transports a clock signal:
- a microprocessor 61 (or CPU),
- a graphics card 62 comprising:
    - several Graphicole Processor Units (or GPUs) 620,
    - a Graphical Random Access Memory (GRAM) 621,
- a non-volatile memory of ROM (Read Only Memory) type 66,
- a Random Access Memory or RAM 67,
- one or several I/O (Input/Output) devices 64 such as for example a keyboard, a mouse, a webcam, and
- a power source 68.

The device 6 also comprises a display device 63 of display screen type directly connected to the graphics card 62 to display notably the displaying of synthesized images calculated and composed in the graphics card, for example live. The use of a dedicated bus to connect the display device 63 to the graphics card 62 offers the advantage of having much greater data transmission bitrates and thus reducing the latency time for the displaying of images composed by the graphics card. According to a variant, a display device is external to the device 6 and is connected to the device 6 by a cable transmitting the display signals. The device 6, for example the graphics card 62, comprises a means for transmission or connection (not shown in FIG. 4) adapted to transmit a display signal to an external display means such as for example an LCD or plasma screen or a video-projector.

It is noted that the word "register" used in the description of memories 62, 66 and 67 designates in each of the memories mentioned, both a memory zone of low capacity (some binary data) as well as a memory zone of large capacity (enabling a whole program to be stored or all or part of the data representative of data calculated or to be displayed).

When switched-on, the microprocessor 61 loads and executes the instructions of the program contained in the RAM 67.

The random access memory 67 notably comprises:
- in a register 630, the operating program of the microprocessor 61 responsible for switching on the device 6,
- parameters 671 representative of the virtual environment 1 (for example modelling parameters of the virtual environment 1, lighting parameters of the virtual environment 1).

The algorithms implementing the steps of the method specific to the invention and described hereafter are stored in the memory GRAM 67 of the graphics card 62 associated with the device 6 implementing these steps. When switched on and once the parameters 670 representative of the environment are loaded into the RAM 67, the graphic processors 620 of the graphics card 62 load these parameters into the GRAM 621 and execute the instructions of these algorithms in the form of microprograms of "shader" type using HLSL (High Level Shader Language) language or GLSL (OpenGL Shading Language) for example.

The random access memory GRAM 621 notably comprises:
- in a register 6210, the parameters representative of the virtual environment 1,
- values 6211 representative of first distance between the light source and the lit points of the virtual environment 1,
- values 6212 representative of second distances between a viewpoint and the points of the virtual environment 1 visible from this viewpoint,
- values 6213 representative of the quantity if incident light received by the virtual environment 1 according to one or several incident directions, and
- values 6214 representative of the quantity of light received at one or several points of the virtual environment 1,
- parameters 6215 representative of groups of one or several points of the virtual environment 1 (for example the constituent first point(s) or groups of points, the normal at the surface covered by each of the groups of point(s), an item of reflectance information associated with each of the groups of point(s), the location of the centre or barycentre of each of the groups of point(s)).

According to a variant, a part of the RAM 67 is assigned by the CPU 61 for storage of the values 6211 to 6214 and the parameters 6215 if the memory storage space available in GRAM 621 is insufficient. This variant however causes greater latency time in the composition of an image comprising a representation of the environment 1 composed from microprograms contained in the GPUs as the data must be transmitted from the graphics card to the random access memory 67 passing by the bus 65 for which the transmission capacities are generally inferior to those available in the graphics card for transmission of data from the GPUs to the GRAM and vice-versa.

According to another variant, the power supply 68 is external to the device 4.

FIG. 7 shows a method for estimation of the quantity of light received in a point P of a virtual environment implemented in a device 6, according to a non-restrictive particularly advantageous embodiment of the invention.

During an initialisation step 70, the different parameters of the device 6 are updated. In particular, the parameters representative of the virtual environment 1 are initialised in any way.

Then, during a step 71, the quantity of incident light received from a light source is estimated for each of the groups of point(s) of a virtual environment lit by the light source. The virtual environment comprises a set of points lit by the light source, the lit points being called first points. In a first embodiment, each group of point(s) comprises a unique first point, the estimation of the quantity of incident light received being carried out for each first point. According to a first variant, at least some of the groups of point(s) comprise several first points. The first points belonging to a same group of points are regrouped after estimation for each first point of the virtual environment of distances separating this first point from other first points of its surrounding points. Once these distances have been estimated, a value representative of the average of distances separating a first point considered from other first points of its neighbouring area is estimated, for each first point of the virtual environment. Then, from the value representative of the average of distances estimated and from information representative of the location of first points and of their orientation (that is to say from the normal at the surface element associated with each of the first points), the first points are regrouped into one or several groups of points. Once the first points are regrouped into groups of points, an item of information representative of the orientation of the group of points (that is to say of the normal at the surface covered by the group of points) is associated with each group of points as well as an item of information representative of the location of the group of points (corresponding for example to the location of the centre of the group of points if the group of points forms a disc or to the location of the barycentre of the group of points if the group of points takes a form other than that of a disc). According to a second variant, at least some of the groups of points comprising several points are regrouped to form one or several second groups of points encompassing several groups of points determined in the first variant. The groups of points selected to be regrouped to form the second group or groups of points are selected according to orientation and location information associated with each of these groups of points. Once the second groups of points are formed, the estimation of the quantity of light received by the groups of points corresponds to an estimation of the quantity of light received by the second groups of points formed from the regrouping of groups of points.

Then during a step 72, a surface regrouping the set of points of the virtual environment 1 visible from a given viewpoint is determined, the point P for which is determined the quantity of light received belonging to this surface.

Then, during a step 73, one or several first groups of points are determined among the plurality of groups of point(s) (and/or among the plurality of second groups of points), the first groups determined being those that contribute to the lighting of the point P by reflection of the incident light received. This determination is carried out according to the visible points of the virtual environment defined in step 72. A group of points is considered as contributing to the lighting of the point P if the line connecting the group of points to the point P has no intersection point with the surface of visible points. In the case where this line has an intersection point with the surface of visible points, then the group of points is considered as not contributing to the lighting of the point P. To determine if there is an intersection between the line and the surface of visible points, the calculations are carried out using coordinates of points considered in the world space. According to a variant and in order to reduce the calculations, the calculations required for the determination of the presence of an intersection are carried out in the space of a depth map associated with the virtual environment 1 and the viewpoint considered.

Finally, during a step 74, the quantity of light received by the point P is estimated from the quantity of incident light received by each of the groups of point(s) contributing to the lighting of the point P and from an item of reflectance information associated with each of the groups of point(s) contributing to the lighting of the point P.

Naturally, the invention is not limited to the embodiments previously described.

In particular, the invention is not limited to a method for estimation of the quantity of light received at a point P of the virtual environment but also extends to any device implementing this method and notably any devices comprising at least one GPU. The implementation of calculations necessary to the estimation of the quantity of light received by the point P is not limited either to an implementation in shader type microprograms but also extends to an implementation in any program type, for example programs that can be executed by a CPU type microprocessor.

The use of the invention is not limited to a live utilisation but also extends to any other utilisation, for example for processing known as postproduction processing in a recording studio for the display of synthesis images for example. The implementation of the invention in postproduction offers the advantage of providing an excellent visual display in terms of realism notably while reducing the required calculation time.

The invention also relates to a method for composition of a video image, in two dimensions or in three dimensions, for which the quantity of light received by any point P visible from a viewpoint according to several observation directions is calculated and the information representative of the light that results is used for the displaying of pixel of the image, each pixel corresponding to an observation direction. The calculated light value for displaying by each of the pixels of the image is re-calculated to adapt to the different viewpoints of the spectator.

The present invention can be used in video game applications for example, whether via programs that can be executed in a PC or portable type computer or in specialised game consoles producing and displaying images live. The device 4 described with respect to FIG. 4 is advantageously equipped with interaction means such as a keyboard and/or joystick, other modes for introduction of commands such as for example vocal recognition being also possible.

The invention claimed is:

1. Method of estimating a quantity of light received at a point P of a virtual environment via a device, said virtual environment comprising a plurality of first points lit by a light source, wherein said method comprises:
   associating via said device, with each said first point of at least a part of said plurality of first points, a value representative of an average of distances separating each said first point from a plurality of first points of a neighbouring area,
   selecting via said device, said first points of said neighbouring area of each said first point according to:
      comparison between said distances separating each said first point from said plurality of first points of said neighbouring area and threshold values, said threshold values being a function of said value associated with each said first point; and
      information representative of location and orientation of said first points,
   grouping via said device, each said first point with said selected first points to form a plurality of groups, an item of orientation information representative of an orientation of said group and an item of location information representative of a location of said group being associated with each said group,
   computing via said device, for each said group, a quantity of incident light received,
   determining via said device, a surface grouping at least some of said points of said virtual environment visible from a viewpoint, said surface comprising said point P,
   determining via said device, at least one first group contributing to lighting of said point P by reflection of said incident light received from said light source according to at least one item of occlusion information associated with said surface, said at least one first group being determined from said plurality of groups, and
   computing via said device, said quantity of light received at said point P from said quantity of incident light received by said at least one first group according to at least one item of reflectance information associated with said at least one first group.

2. Method according to claim 1, wherein said surface is determined from a depth map representative of a distance between a viewpoint and each point of the virtual environment visible from said viewpoint.

3. Method according to claim 1, further comprised of:
   grouping said groups of first points to form a plurality of second groups according to said item of orientation information and item of location information associated with said groups, an item of orientation information representative of the orientation of the second group and an item of location information representative of the location of the second group being associated with each second group, said at least a first group being determined from said plurality of second groups.

4. Method according to claim 1, wherein said information representative of the location of first points is obtained by estimation of first distances separating said light source from said first points according to incidence directions, said first distances being stored in a shadow map associated with said virtual environment and with said light source.

5. Method according to claim 1, further comprised of computing second distances separating said viewpoint and said points of the environment visible from said viewpoint, said second distances being stored in a depth map associated with said virtual environment and said viewpoint, said at least one item of occlusion information being obtained from said second distances.

6. A device for estimating a quantity of light received at a point P of a virtual environment, said virtual environment comprising a plurality of first points lit by a light source, wherein said device comprises at least one processor configured for:
   associating, with each said first point of at least a part of said plurality of first points, a value representative of an average of distances separating each said first point from a plurality of first points of a neighbouring area,
   selecting said first points of said neighbouring area of each said first point according to:
      comparison between said distances separating each said first point from said plurality of first points of said neighbouring area and threshold values, said threshold values being a function of said value associated with each said first point; and
      information representative of location and orientation of said first points,
   grouping each said first point with said selected first points to form a plurality of groups, an item of orientation information representative of an orientation of said group and an item of location information representative of a location of said group being associated with each said group,
   computing, for each said group, a quantity of incident light received,
   determining a surface grouping at least some of said points of said virtual environment visible from a viewpoint, said surface comprising said point P,
   determining at least one first group contributing to lighting of said point P by reflection of said incident light received from said light source according to at least one item of occlusion information associated with said surface, said at least one first group being determined from said plurality of groups, and
   computing said quantity of light received at said point P from said quantity of incident light received by said at least one first group according to at least one item of reflectance information associated with said at least one first group.

7. The device according to claim 6, wherein the at least one processor is configured for determining said surface from a depth map representative of a distance between a viewpoint and each point of the virtual environment visible from said viewpoint.

8. The device according to claim 6, wherein the at least one processor is further configured for grouping said groups of first points to form a plurality of second groups according to said item of orientation information and item of location information associated with said groups, an item of orientation information representative of the orientation of the second group and an item of location information representative of the location of the second group being associated with each second group, said at least a first group being determined from said plurality of second groups.

9. The device according to claim 6, wherein the at least one processor is configured for determining information representative of the location of first points by computing first distances separating said light source from said first points according to incidence directions, said first distances being stored in a shadow map associated with said virtual environment and with said light source.

10. The device according to claim 6, wherein the at least one processor is further configured for computing second distances separating said viewpoint and said points of the environment visible from said viewpoint, said second distances being stored in a depth map associated with said virtual environment and said viewpoint, said at least one item of occlusion information being obtained from said second distances.

* * * * *